(12) United States Patent
Shaburov et al.

(10) Patent No.: US 9,852,328 B2
(45) Date of Patent: Dec. 26, 2017

(54) EMOTION RECOGNITION IN VIDEO CONFERENCING

(71) Applicants: Victor Shaburov, Castro Valley, CA (US); Yurii Monastyrshyn, Odessa (UA)

(72) Inventors: Victor Shaburov, Castro Valley, CA (US); Yurii Monastyrshyn, Odessa (UA)

(73) Assignee: SNAP INC., Venice, CA (US)

( * ) Notice: Subject to any disclaimer, the term of this patent is extended or adjusted under 35 U.S.C. 154(b) by 0 days.

(21) Appl. No.: 15/430,133

(22) Filed: Feb. 10, 2017

(65) Prior Publication Data

US 2017/0154211 A1 Jun. 1, 2017

Related U.S. Application Data

(63) Continuation of application No. 14/661,539, filed on Mar. 18, 2015, now Pat. No. 9,576,190.

(51) Int. Cl.
*G06K 9/00* (2006.01)
*G10L 25/63* (2013.01)
(Continued)

(52) U.S. Cl.
CPC ..... *G06K 9/00315* (2013.01); *G06K 9/00201* (2013.01); *G06K 9/00248* (2013.01);
(Continued)

(58) Field of Classification Search
None
See application file for complete search history.

(56) References Cited

U.S. PATENT DOCUMENTS 6,038,295 A 3/2000 Mattes
6,980,909 B2 12/2005 Root et al.
(Continued)

FOREIGN PATENT DOCUMENTS

CA 2887596 A1 7/2015
WO WO-2016149579 A1 9/2016

OTHER PUBLICATIONS

"U.S. Appl. No. 14/661,539, Final Office Action dated Apr. 14, 2016", 9 pgs.
(Continued)

*Primary Examiner* — Hadi Akhavannik
(74) *Attorney, Agent, or Firm* — Schwegman Lundberg & Woessner, P.A.

(57) ABSTRACT

Methods and systems for videoconferencing include recognition of emotions related to one videoconference participant such as a customer. This ultimately enables another videoconference participant, such as a service provider or supervisor, to handle angry, annoyed, or distressed customers. One example method includes the steps of receiving a video that includes a sequence of images, detecting at least one object of interest (e.g., a face), locating feature reference points of the at least one object of interest, aligning a virtual face mesh to the at least one object of interest based on the feature reference points, finding over the sequence of images at least one deformation of the virtual face mesh that reflect face mimics, determining that the at least one deformation refers to a facial emotion selected from a plurality of reference facial emotions, and generating a communication bearing data associated with the facial emotion.

20 Claims, 12 Drawing Sheets

(51) Int. Cl.
    *H04N 7/15*     (2006.01)
    *H04N 7/14*     (2006.01)
    *G06K 9/62*     (2006.01)
    *G06T 7/33*     (2017.01)
    *G06Q 30/02*     (2012.01)
    *G10L 25/57*     (2013.01)

(52) U.S. Cl.
    CPC ..... *G06K 9/00261* (2013.01); *G06K 9/00281* (2013.01); *G06K 9/6209* (2013.01); *G06Q 30/0281* (2013.01); *G06T 7/337* (2017.01); *G06T 7/344* (2017.01); *G10L 25/63* (2013.01); *H04N 7/147* (2013.01); *H04N 7/15* (2013.01); *G06T 2207/10016* (2013.01); *G06T 2207/30201* (2013.01); *G10L 25/57* (2013.01)

(56) References Cited

U.S. PATENT DOCUMENTS

| | | |
|---|---|---|
| 7,173,651 B1 | 2/2007 | Knowles |
| 7,411,493 B2 | 8/2008 | Smith |
| 7,535,890 B2 | 5/2009 | Rojas |
| 8,131,597 B2 | 3/2012 | Hudetz |
| 8,199,747 B2 | 6/2012 | Rojas et al. |
| 8,332,475 B2 | 12/2012 | Rosen et al. |
| 8,718,333 B2 | 5/2014 | Wolf et al. |
| 8,724,622 B2 | 5/2014 | Rojas |
| 8,874,677 B2 | 10/2014 | Rosen et al. |
| 8,909,679 B2 | 12/2014 | Root et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,443,227 B2 | 9/2016 | Evans et al. |
| 9,489,661 B2 | 11/2016 | Evans et al. |
| 9,491,134 B2 | 11/2016 | Rosen et al. |
| 9,576,190 B2 | 2/2017 | Shaburov et al. |
| 2004/0201586 A1* | 10/2004 | Marschner ........... G06K 9/4661 345/426 |
| 2004/0263510 A1* | 12/2004 | Marschner ............. G06T 13/40 345/419 |
| 2005/0063582 A1* | 3/2005 | Park ....................... G06T 17/10 382/154 |
| 2005/0131744 A1 | 6/2005 | Brown et al. |
| 2007/0047768 A1* | 3/2007 | Gordon .................. G06T 7/246 382/103 |
| 2009/0285456 A1* | 11/2009 | Moon ................ G06K 9/00315 382/118 |
| 2010/0211397 A1* | 8/2010 | Park ........................ G10L 17/26 704/276 |
| 2011/0032378 A1* | 2/2011 | Kaneda .............. G06K 9/00288 348/222.1 |
| 2011/0202598 A1 | 8/2011 | Evans et al. |
| 2011/0263946 A1* | 10/2011 | el Kaliouby ......... A61B 5/1128 600/300 |
| 2012/0209924 A1 | 8/2012 | Evans et al. |
| 2014/0192141 A1 | 7/2014 | Begeja et al. |
| 2015/0286858 A1 | 10/2015 | Shaburov et al. |

OTHER PUBLICATIONS

"U.S. Appl. No. 14/661,539, Notice of Allowance dated Oct. 7, 2016", 7 pgs.

"U.S. Appl. No. 14/661,539, Response filed Mar. 8, 2016 to Non Final Office Action dated Dec. 8, 2015", 11 pgs.

"U.S. Appl. No. 14/661,539, Response filed Sep. 14, 2016 to Final Office Action dated Apr. 14, 2016", 12 pgs.

"U.S. Appl. No. 14/661,539, Response filed Nov. 25, 2015 to Restriction Requirement dated Sep. 28, 2015", 8 pgs.

"U.S. Appl. No. 14/661,539, Restriction Requirement dated Sep. 28, 2015", 6 pgs.

"International Application Serial No. PCT/US2016/023063, International Search Report dated Aug. 12, 2016", 5 pgs.

"International Application Serial No. PCT/US2016/023063, Written Opinion dated Aug. 12, 2016", 8 pgs.

Cohn, Jeffrey F, et al., "Bimodal expression of emotion by face and voice", Proceedings of the Sixth Acm International Conference on Multimedia Face/Gesture Recognition and Their Applications, (Jan. 1, 1998), 41-44 pgs.

Jorgen, Ahlberg, et al., "Candide-3—An Updated Parameterised Face", Retrieved from the Internet: <http://www.bk.i sy.liu.se/publications/LiTH-ISY-R-2326.pdf>, (Jan. 1, 2001).

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

Tian, Y-T, et al., "Recognizing Action Units for Facial Expression Analysis", IEEE Transactions on Pattern Analysis and Machine Intelligence, IEEE Computer Society, (Feb. 1, 2001), 97-115 pgs.

\* cited by examiner

EMOTION RECOGNITION IN VIDEO CONFERENCING

TECHNICAL FIELD

This disclosure relates generally to video conferencing and, more particularly, to systems and methods for recognizing emotions of participants in video conferencing.

DESCRIPTION OF RELATED ART

Today, video conferencing and videophone calls are popular tools for conducting two-way video and audio communications over long distances. This technology has been developing rapidly due to the emergence of high speed networking solutions, inexpensive hardware components, and deployment of cellular networks. Typically, video conferencing allows two or more individuals to communicate with each other using a variety of software applications, such as video chat applications, where the participants can view each other while talking. Video chats can be available on general-purpose computers, mobile devices, and television systems as downloadable software applications or web services. Traditional hardware requirements for video conferencing include, on each side, an input audio module (e.g., a microphone), input video module (e.g., a video camera), output audio module (e.g., speakers), output video module (e.g., a display or projector), and a computing device that ties together input and output modules, compresses and decompresses audio and video streams, and initiates and maintains the data linkage via a communications network.

Videoconferencing has become popular in the customer service and support industry by providing direct communication with customers regardless of their location. For example, video chat can enable face-to-face interactions between customer service representatives and customers. Typically, chat sessions can be initiated from kiosks, mobile devices, and web and social media channels. This allows companies to provide personalized attention to each customer and conduct video interviews, sales, promotions, services, support, and other video collaboration.

Although videoconferencing creates a useful channel to provide services to customers, one challenging issue is to deal with irate, annoyed and distressed customers. Customer anger is not always easy to spot even to professional service providers or sale representatives. One of the important strategies in sales and customer service is to detect when a customer is angry or annoyed and prevent difficult situations at a very early stage. Unfortunately, it is a very difficult task even to experienced professionals.

SUMMARY

This disclosure relates generally to the technology for video conferencing, in which an emotional status of participating individuals can be recognized. The videoconferencing may include two or more participants including, for example, a customer and a customer service representative. If the recognized emotional status relates to a negative emotion, such as anger, stress, irritation, and annoyance, the emotional status can be reported to one of the videoconference participants and/or a third party such as a supervisor, administrator, or manager. Optionally, the third party can enter into the videoconference between the individuals to resolve any issues. The technology allows determining the emotional status by analyzing a video channel to detect facial emotions and/or an audio channel to detect speech emotions. The present technology can recognize facial emotions by locating feature reference points (e.g., facial landmarks) on the video, aligning a virtual face mesh to the feature reference points, and finding mesh deformations that reflect face mimics. Speech emotions can be recognized by extracting voice features and determining changes thereof.

According to one aspect of the technology, a computer-implemented method for videoconferencing is provided. The method comprises the steps of: receiving a video including a sequence of images; detecting at least one object of interest in one or more of the images e.g., a face); locating feature reference points of the at least one object of interest; aligning a virtual face mesh (also referred herein to as "mesh" for simplicity) to the at least one object of interest in one or more of the images based at least in part on the feature reference points; finding over the sequence of images at least one deformation of the mesh that is associated and reflect at least one face mimic of the at least one object of interest; determining that the at least one deformation refers to a facial emotion selected from a plurality of reference facial emotions; and generating a communication bearing data associated with the facial emotion.

In some embodiments, the determination that the at least one deformation refers to the facial emotion selected from the plurality of reference facial emotions can include: comparing the at least one deformation of the mesh to reference facial parameters of the plurality of reference facial emotions; and selecting the facial emotion based on the comparison of the at least one deformation of the mesh to the reference facial parameters of the plurality of reference facial emotions. In certain embodiments, the comparing of the at least one deformation of the mesh to reference facial parameters can comprise applying a convolution neural network. In certain embodiments, the comparing of the at least one deformation of the mesh to reference facial parameters can comprise applying a state vector machine.

In various embodiments, the method may further comprise establishing a one-way or two-way videoconferencing between a service provider and a customer, wherein the video is captured on a customer side. The method may further comprise transmitting the communication over a communications network to a third party. The method may further comprise allowing the third party to enter into the videoconference between the customer and the service provider, if the facial emotion associated with the at least one deformation of the mesh relates to a negative facial emotion. In some embodiments, the method may further comprise transmitting and presenting the communication to a customer service representative or a service provider.

In certain embodiments, the at least one object of interest includes a face of an individual. In certain embodiments, the feature reference points can include facial landmarks. In certain embodiments, the feature reference points can include one or more facial landmarks indicating at least one of the following: an eyebrows vertical position, an eyes vertical position, an eyes width, an eyes height, an eye separation distance, a nose vertical position, nose pointing up, a mouth vertical position, a mouth width, a chin width, a upper lip raiser, a jaw drop, a lip stretcher, a left brow lowerer, a right brow lowerer, a lip corner depressor, and an outer brow raiser.

In various embodiments, the method may further comprise receiving a request to determine facial emotions of a video conferencing participant. In some embodiments, the detecting of the at least one object of interest can include applying a Viola-Jones algorithm to the images. In various embodiments, the locating of the feature reference points can include applying an Active Shape Model algorithm to areas of the images associated with the at least one object of interest.

In certain embodiments, the aligning of the mesh can be based on shape units (SUs) associated with a face shape of the at least one object of interest. In one example embodiment, the step of aligning the mesh can comprise estimating intensities of the SUs associated with the face shape, estimating intensities of action units (AUs) associated with the at least one face mimic, and estimating of rotations of the virtual face mesh around three orthogonal axes and its translations along the axes. In certain embodiments, the step of detecting the at least one object of interest can be based on a user input. In some embodiments, the plurality of facial emotions can include at least a neutral facial emotion, a positive facial emotion, and a negative facial emotion. The negative facial emotion can include at least one of anger, stress, frustration, embarrassment, irritation, and annoyance.

In various embodiments, the method may further comprise receiving an audio stream associated with the video and recognizing a speech emotion of the at least one object of interest in the audio stream. The recognizing of the speech emotion may comprise extracting at least one voice feature from the audio stream, comparing the extracted at least one voice feature to a plurality of reference voice features, and selecting the speech emotion based on the comparison of the extracted at least one voice feature to the plurality of reference voice features. In some embodiments, the recognizing of the speech emotion can comprise recognizing a speech in the audio stream. In some embodiments, the communication can further include data associated with the speech emotion. In yet more embodiments, the method may further comprise combining the facial emotion and the speech emotion to generate an emotional status of an individual associated with the at least one object of interest. In yet more embodiments, the method may further comprise detecting one or more gestures, determining that the one or more gestures refer to a predetermined emotion, and generating an emotional status of an individual based on the facial emotion and determination that the one or more gestures refer to the predetermined emotion.

According to another aspect of the technology, a computing system is provided. An example system comprises a computing device including at least one processor and a memory storing processor-executable codes, which, when implemented by the least one processor, cause the device to perform the method steps described above.

According to yet another aspect of the technology, there is provided a non-transitory processor-readable medium having instructions stored thereon, which when executed by one or more processors, cause the one or more processors to implement the method steps described above.

Additional objects, advantages, and novel features will be set forth in part in the detailed description, which follows, and in part will become apparent to those skilled in the art upon examination of the following detailed description and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1A:
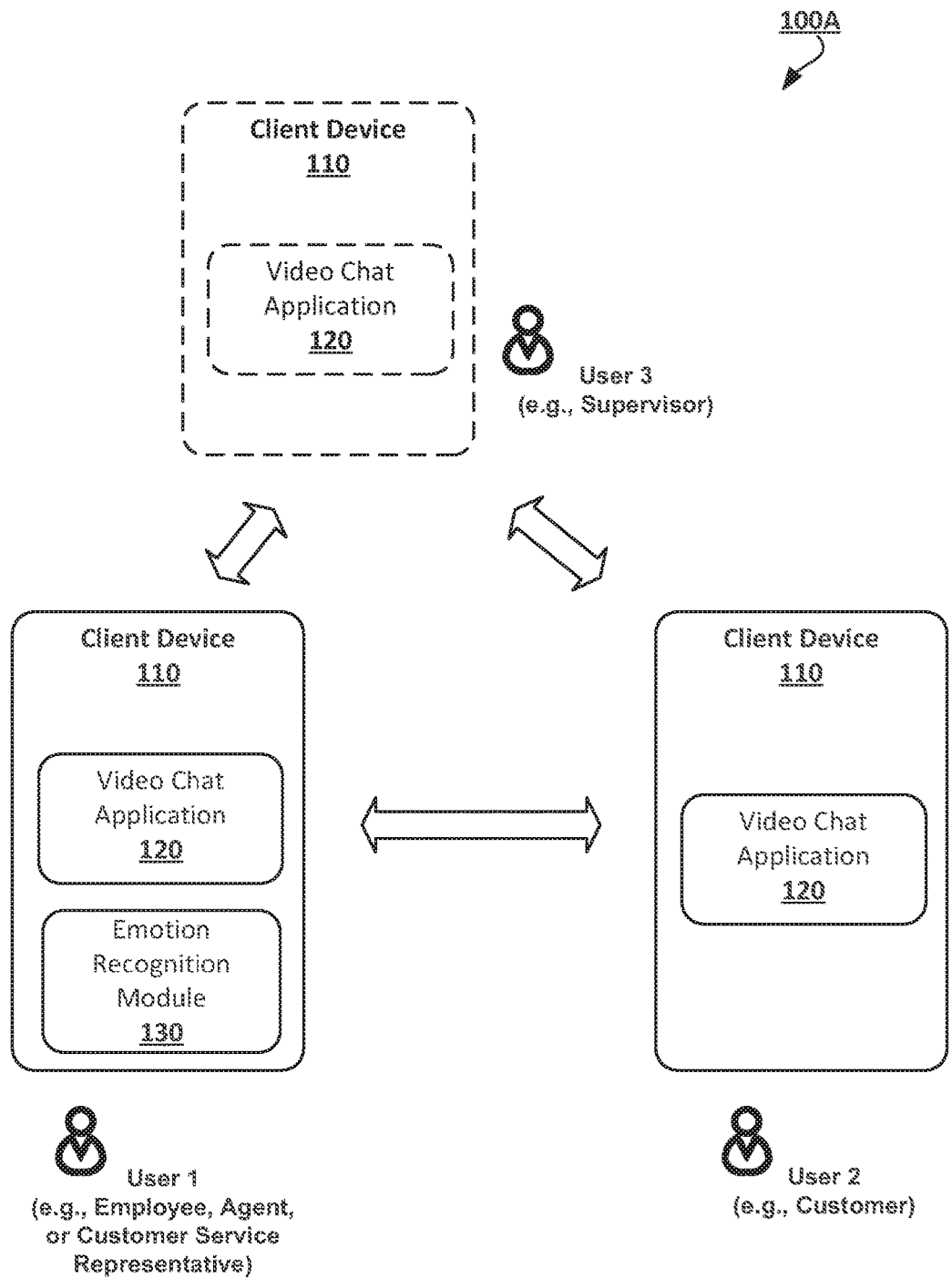
FIG. 1A shows a high-level block diagram of a first example system environment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Present teachings may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a transitory or non-transitory storage medium such as a disk drive or computer-readable medium. It should be noted that methods disclosed herein can be implemented by a server, network device, general-purpose computer (e.g., a desktop computer, tablet computer, laptop computer), mobile device (e.g., cellular phone, smart phone), game console, handheld gaming device, television system, set-top box, in-vehicle computing device, kiosk, and so forth.

1. INTRODUCTION

The present technology provides for methods and systems for videoconferencing, which allow for determining an emotional status of at least one videoconference participant by analyzing video images and/or audio associated with the videoconference participant. The videoconferencing may include two or more participants including, for example, a customer and a customer service representative. Emotional status can be determined by identifying facial emotions and/or speech emotions. For these ends, the present technology allows for tracking changes in facial expressions and/or voice features over time. In various embodiments, facial emotions can be identified by locating feature reference points of the videoconference participant, aligning a virtual face mesh (also referred to as "mesh" for simplicity) based at least in part on the feature reference points, finding or determining mesh changes that reflect one or more face mimics, and comparing the mesh changes with reference facial parameters of a plurality of reference emotions stored in a database. Speech emotions can be identified by detecting and analyzing voice features and comparing voice features to a plurality of reference voice features stored in a database. Once the emotional status is identified, it can be reported to one of the videoconference participants and/or a third party such as a supervisor, manager, moderator, or administrator. For example, when the emotional status of one videoconference participant is identified and reported to relating to a negative emotion, such as anger, stress, irritation, and annoyance, another videoconference participant can start adjusting his speech, initiate managing of customer anger, and the like. In addition, a supervisor may be enabled to start watching the process of communicating between these participants and optionally enter into the videoconference to resolve negative emotion issues.

The term "videoconferencing," as used herein, refers to a telecommunication technology, which allows two or more people to communicate by simultaneous two-way video and audio transmissions. The video transmissions include communicating a plurality of video images. In this disclosure, the term "video conferencing" incorporates similar terms including, for example, "videophone calling," "videotelephony," "video teleconferencing," and "video chat," among others.

As discussed below in details, the core element of this technology is locating and tracking individuals in video images, and further detecting facial expressions and optionally individual gestures so as to determine an emotional status. According to various embodiments, facial expressions can be detected and tracked using a variety of video processing algorithms. For example, individual faces can be detected using the combination of Viola-Jones algorithm, which is targeted to detect a face in video images, and an Active Shape Model (ASM) algorithm, which is designed to locate feature reference points associated with the face. Once faces are detected, a mesh based on the feature reference points can be aligned to the individuals in the video images. Further, changes and deformations of the mesh can be found and analyzed. In some embodiments, changes and deformations of the mesh, that reflect and associated with face mimics, can be compared to reference facial parameters and based on the comparison, it can be determined that the mesh deformation refers to a facial emotion selected from a plurality of reference facial emotions. The emotional status of an individual can be based at least in part on the facial emotion. In some embodiments, the emotional status is transmitted to one or more videoconference participants or third parties.

The video processing algorithm, as described herein, can be applied to a video stream in real time or it can be applied to a stored video file (including progressive download solutions). Moreover, in some embodiments, the video processing is applied to each video images individually, while in other embodiments, the video processing can be applied to a video as a whole. It should be also noted that the video processing steps can be implemented on either a client side, a server side, or both, depending on a particular system's architecture.

2. COMPUTING ENVIRONMENT

In general, video conferencing can be implemented using one or more software applications running on a client side, server side, or both. In some embodiments, the video conferencing can be implemented as a web service or as a "cloud" solution, meaning it is available to videoconference participants via a website or web interface.

FIG. 1A shows a high-level block diagram of a first peer-to-peer (P2P) example system environment 100A suitable for practicing the present technology. As shown in this figure, there are at least two client devices 110, each belonging to separate individuals in different locations. In one example, one user may refer to a customer, while another one may refer to a customer service representative. In yet another embodiment, there can be at least three videoconference participants, including, for example, a customer service representative, customer, and supervisor or manager of the customer service representative.

Client devices 110 refer to, but are not limited, a user device, terminal, computing device (e.g., laptop computer, tablet computer, desktop computer), cellular phone, smart phone, personal digital assistant (PDA), gaming console, remote control, multimedia system, television system, set-top box, infotainment system, in-vehicle computing device, informational kiosk, and so forth. Each of client devices 110 has a video chat application 120. The video chat applications 120 are generally configured to enable video conferencing between two or more users. Video chat applications 120 can be implemented as software, middleware or firmware, and can be separate application or constitute a part of larger software applications.

At least one of client devices 110 further includes emotion recognition module 130, which is configured to detect a particular emotional status of at least one user (e.g., the customer) and report it to at least one other user (e.g., the customer service representative and/or supervisor). In some embodiments, emotion recognition module 130 is a separate software application, while in other embodiments emotion recognition module 130 is a part of another software application such as video chat application 120, web service, and so forth.

As shown in FIG. 1A, client devices 110 are connected into a peer-to-peer (P2P) network allowing their direct video teleconferencing with each other. Data between nodes can be exchanged directly using, for example, TCP/IP (Transmission Control Protocol/Internet Protocol) network communication standards. In some embodiments, the P2P network can include more than three client devices 110.

Figure 1B:
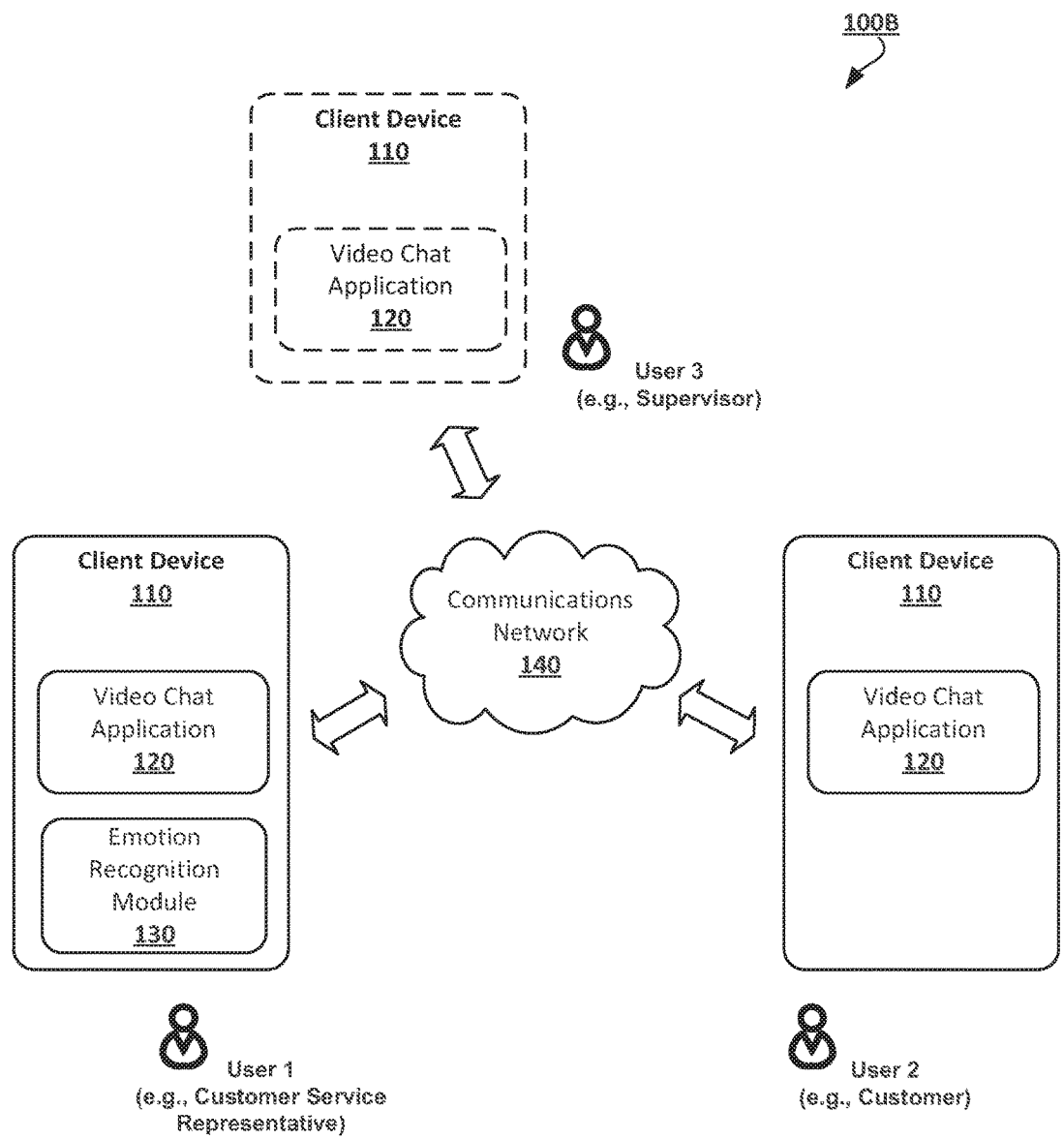
FIG. 1B shows a high-level block diagram of a second example system environment.

FIG. 1B shows a high-level block diagram of a second example system environment 10013 suitable for practicing the present technology. As shown in this figure, the communication between client devices 110 is performed via a communications network 140. In various embodiments, communications network 140 may include one or more of the Internet, intranet, cellular network, local area network, wide area network, Institute of Electrical and Electronics Engineers (IEEE) 802.11 based network, Bluetooth radio, and so forth. Similar to above, video teleconferencing between client devices 110 can be implemented using, for example, TCP/IP network communication standards.

Figure 2:
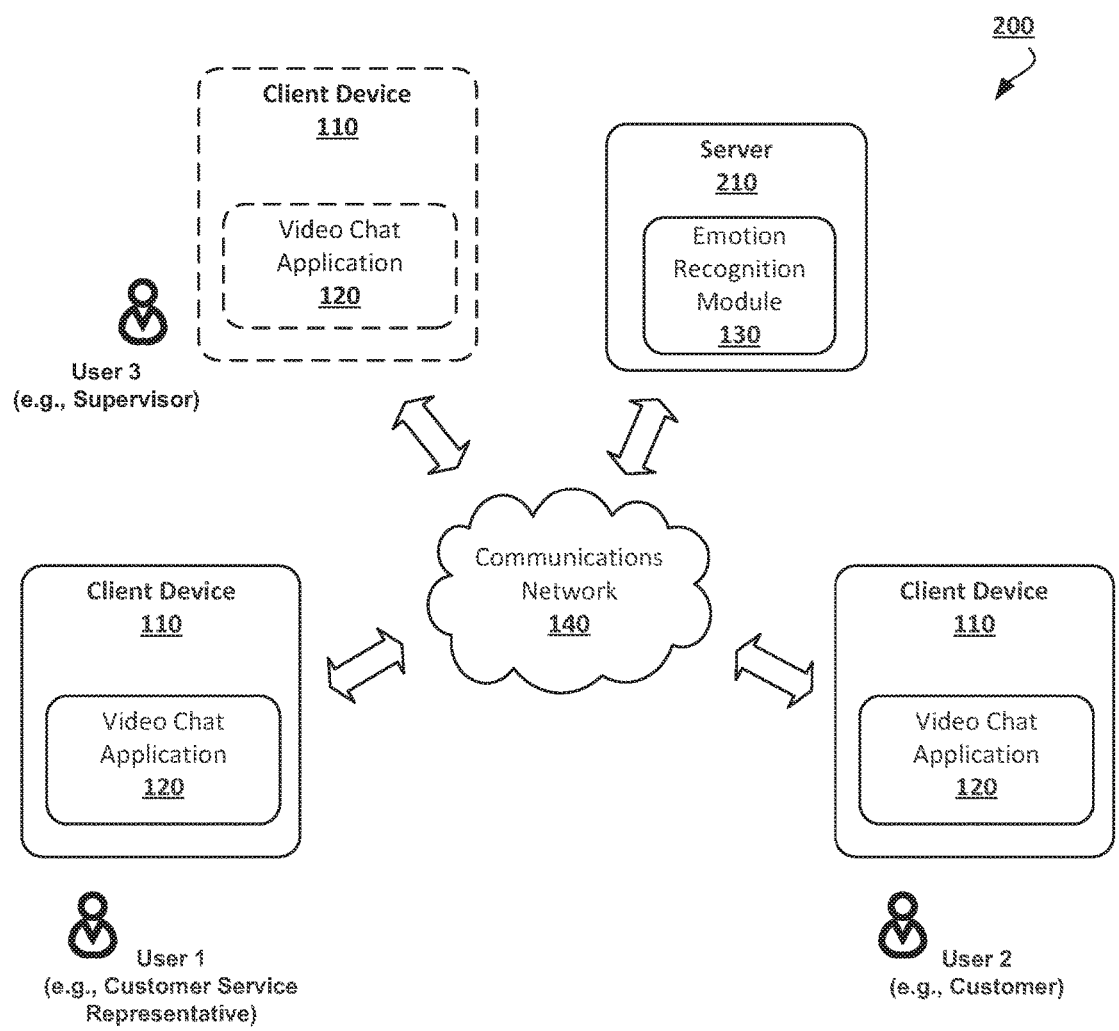
FIG. 2 shows a high-level block diagram of a third example system environment.

FIG. 2 shows a high-level block diagram of a third example system environment 200 suitable for practicing the present technology. In this embodiment, there is provided server 210 that includes emotion recognition module 130, while client devices 110 do not implement emotion recognition processes. Accordingly, emotion recognition, as well as other audio and video processing processes as described herein are implemented on server 210. The communication between video chat applications 120 and emotion recognition module 130 can include the use of application programming interface (API) codes.

In some embodiments, video streaming between client devices 110 can occur via server 210 such that client devices 110 are responsible for audio and video capture, audio and video delivery, and data transfer. In other embodiments, server 210 provides emotion recognition processes only, while client devices 110 implement the remaining communication tasks.

Figure 3:
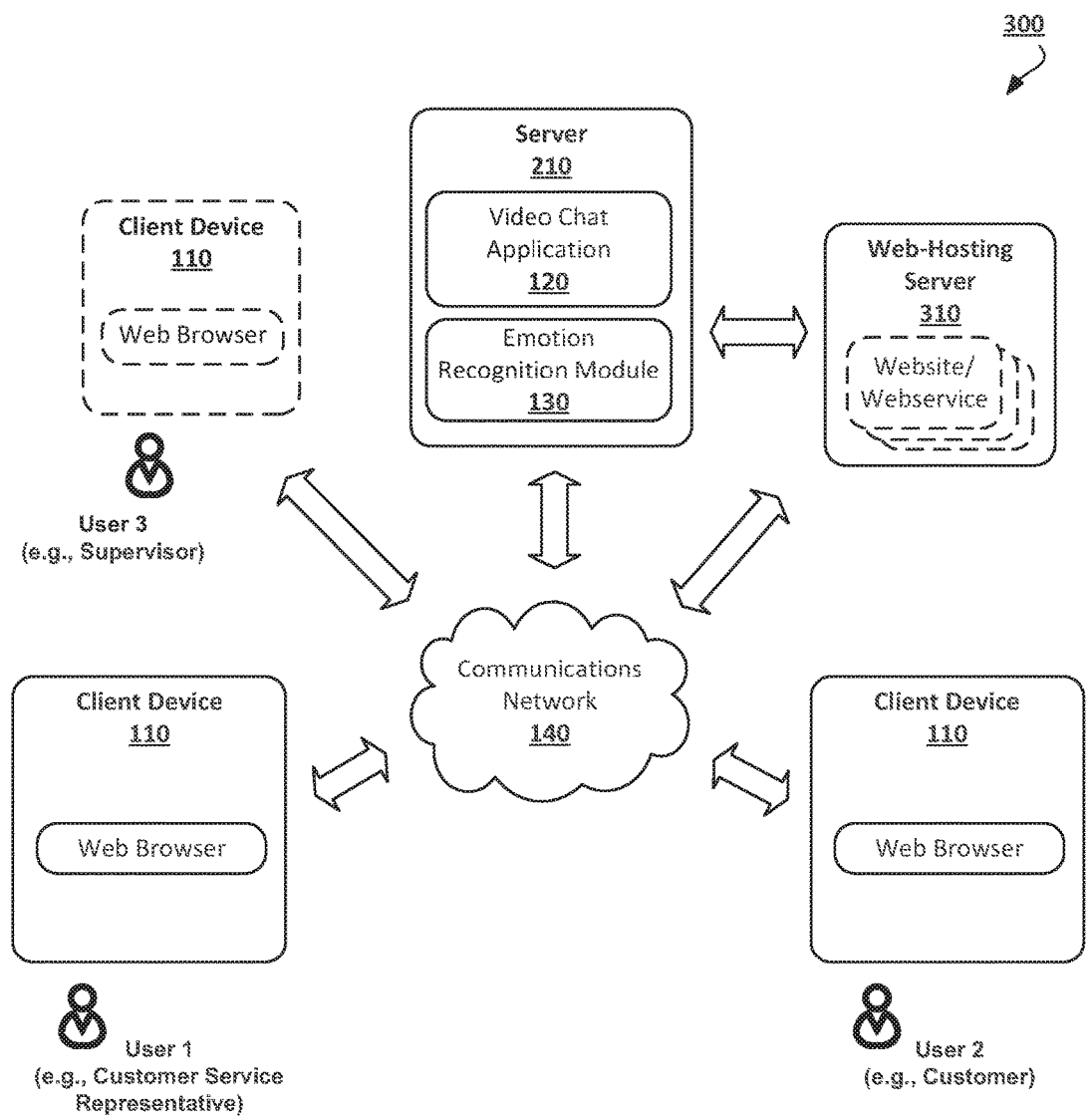
FIG. 3 shows a high-level block diagram of a fourth example system environment.

FIG. 3 shows a high-level block diagram of a fourth example system environment 300 suitable for practicing the present technology. In this example, client devices 110 include web browsers allowing the users to access a predetermined website or web service hosted by web-hosting server 310. Video chat application 120, in this embodiment, is located at server 210 and implemented as a web service associated with the website hosted by web-hosting server 310. Therefore, the video processing and emotion recognition processes, as described herein, are performed completely on the server side.

3. SYSTEM ARCHITECTURE AND PROCESS OVERVIEW

Figure 4:
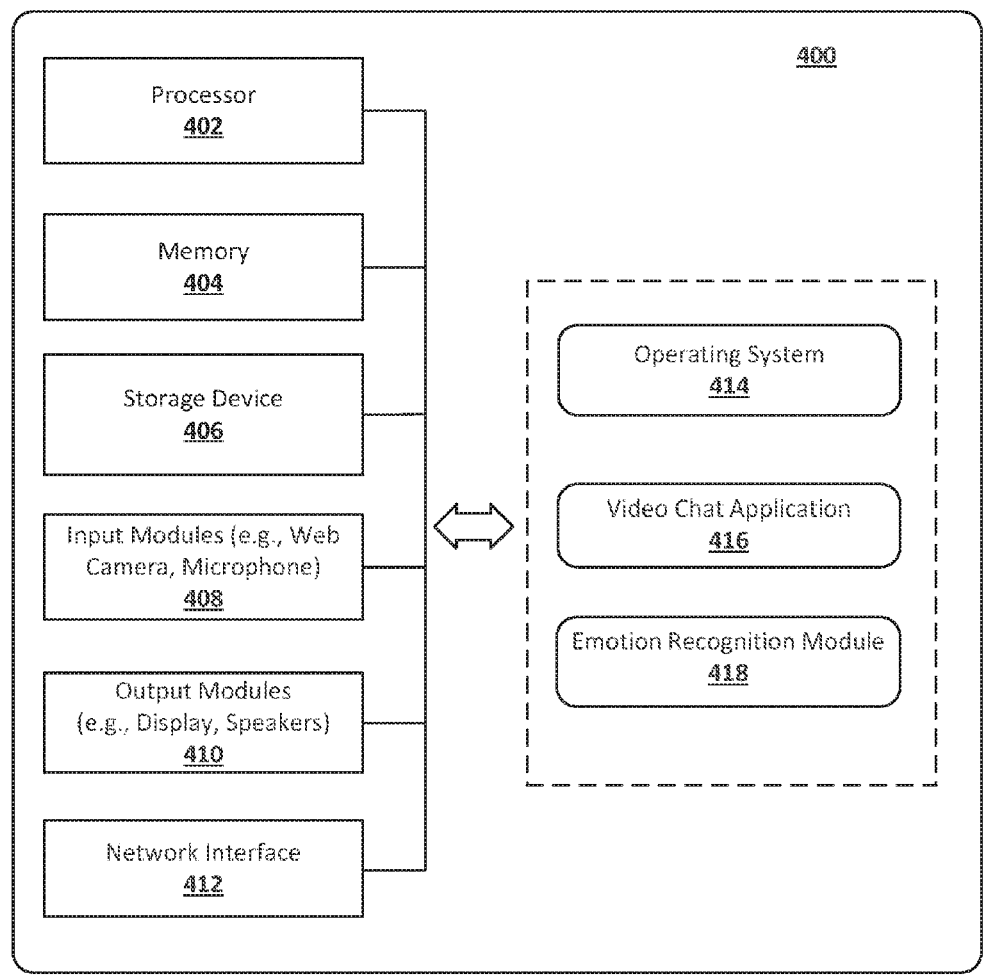
FIG. 4 is a high-level block diagram illustrating an example system suitable for implementing methods for video conferencing described herein.

FIG. 4 is a high-level block diagram illustrating an example system 400 suitable for implementing the methods for video conferencing described herein. Note that all components of system 400 may include logic elements, hardware components, software (firmware) components, virtual components, or a combination thereof. System 400 may include or relate to an integral part of one or more of a variety of types of devices and systems such as a general-purpose computer, network device, server, web service, Apache server, cloud-computing service, and so forth. In one example, system 400 refers to exemplary client device 110. Further, all modules shown in FIG. 4 may be operatively coupled using any suitable wired, wireless, radio, electrical, or optical standards.

As shown in this figure, system 400 includes the following hardware components: at least one processor 402, at least one memory 404, at least one storage device 406, at least one input module 408, at least one output module 410, and at least one network interface 412. System 400 also includes optional operating system 414, video chat application 416 and optional emotion recognition module 418.

In various embodiments, processor 402 implements functionality and/or processes instructions for execution within the system 400. For example, processor 402 may process instructions stored in memory 404 and/or instructions stored on storage devices 406. Such instructions may include components of operating system 414 and video chat application 416. System 400 may include multiple processors 402 such as a central processing unit (CPU) and graphic processing unit (GPU), which can share operational tasks with each other.

Memory 404 is configured to store information within system 400 during operation. Memory 404, in some example embodiments, refers to a non-transitory computer-readable storage medium or a computer-readable storage device. In some examples, memory 404 is a temporary memory, meaning that a primary purpose of memory 404 may not be long-term storage. Memory 404 may also refer to a volatile memory, meaning that memory 404 does not maintain stored contents when memory 404 is not receiving power. Examples of volatile memories include random access memories (RAM), dynamic random access memories (DRAM), static random access memories (SRAM), and other forms of volatile memories known in the art. In some examples, memory 404 is used to store program instructions for execution by the processor 402. Memory 404 may be also used to temporarily store information during program execution.

Storage device 406 can include one or more transitory or non-transitory computer-readable storage media and/or computer-readable storage devices. In some embodiments, storage device 406 may be configured to store greater amounts of information than memory 404. Storage device 406 can be further configured for long-term storage of information. In some examples, storage device 406 includes non-volatile storage elements. Examples of such non-volatile storage elements include magnetic hard discs, optical discs, solid-state discs, flash memories, forms of electrically programmable memories (EPROM) or electrically erasable and programmable memories (EEPROM), and other forms of non-volatile memories known in the art.

Still referencing to FIG. 4, system 400 includes one or more input modules 408 for receiving user inputs and one or more output modules 410 for delivering data to a user. Input modules 408 may include keyboard, trackball, touchscreen, microphone, video camera, web camera, and the like. Output modules 410 may include any appropriate device to deliver data through visual or audio channels, including displays, monitors, printers, touchscreens, speakers, and so forth.

System 400 further includes network interface 412 which is configured to communicate with external devices, servers, and network systems via one or more communications networks 140. Network interface 412 may be a network interface card, such as an Ethernet card, optical transceiver, radio frequency transceiver, or any other device that can send and receive information. Other examples of such network interfaces may include Bluetooth®, 3G (Third Generation), 4G (Fourth Generation), LTE (Long-Term Evolution), and WiFi® radios.

Operating system 414 may control one or more functionalities of system 400 or components thereof. For example, operating system 414 may interact with video chat application 416 and may further facilitate interactions between video chat application 416 and processor 402, memory 404, storage device 406, input modules 408, output modules 410, and/or network interface 412. Video chat application 416 is configured to provide video conferencing services by implementing two-way audio and video communications with another system. System 400 may also include emotion recognition module 418 for recognizing emotional statuses of video conference participants, generating reports or notices associated with particular recognized emotional statuses, and allowing third parties to enter (invoke) into a videoconference process. As described below, emotion recognition module 418 can determine emotional statuses by analyzing particular features in video and/or audio streams. In some embodiments, system 400 may include additional software applications including, for example, web browsers, encoders, codecs, encryption application, and so forth.

A typical operation of system 400 is as follows. Video chat application 416 provides an interface, including a graphical user interface, enabling to initiate and conduct a videoconference between two or more individuals. A camera (i.e., within input module 408) captures a first video stream, which may include a first individual (e.g., a customer service representative). A microphone (i.e., same input module 408) captures a first audio stream, which may include a speech of the first individual. The first audio and video streams are then transmitted to another system for video processing, client device or a server via network interface 412. In some embodiments, the first audio stream and/or the first video stream can be modified by system 400 such as by making visual or acoustic adjustments, compression, encryption, and the like. System 400 may also receive videoconference communications from another system for videoconferencing, client device, or server, which communications may include second audio stream and/or second video stream. These streams include video and audio content associated with a second individual (e.g., a customer). The second audio and/or video streams may be optionally modified, for example, by making visual or acoustic adjustments, decompression, decryption, and the like. The second audio stream can be presented to the first individual via speakers (output module 410). The second video stream can be played back on a display (same output module 410). Upon receipt of the second audio and/or video streams, emotion recognition module 418 may determine an emotional status of the second individual (i.e., the customer). If it is determined that the emotional status refers to customer's anger, stress, irritation, or annoyance, emotion recognition module 418 generates an alert or any other suitable communication and sends it to attention of the first individual (customer service representative) and/or optionally to a remote device for attention of a third individual such as a manager, supervisor, administrator, or moderator. The alert or communication regarding the emotional status of the second individual can be displayed via the graphical user interface of video chat application 416. Emotion recognition module 418 can also allow the third individual to enter into the videoconference between the first individual and second individual. In certain embodiments, the videoconferencing between the second individual and first individual can be switched to videoconferencing between the second individual (i.e., the customer) and third individual (e.g., the supervisor).

4. FACE DETECTION

The instant technology allows for recognizing emotional statuses of video conference participants. To these ends, this technology detects individuals, and more specifically, individual faces presented in a video stream, and tracks facial emotions over time. This section is focused on example processes for face detection as can be used in the present technology.

Figure 5:
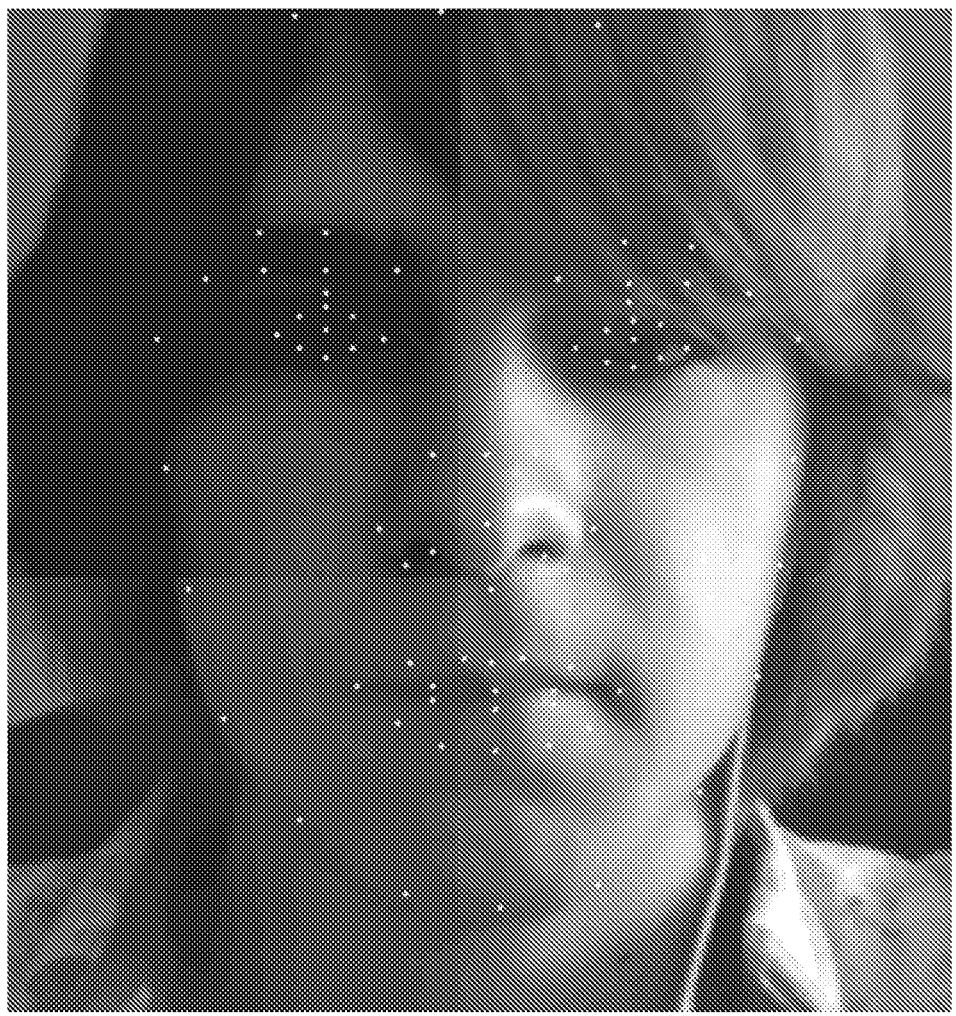
FIG. 5 shows an example image of a face with multiple reference feature points.

According to various embodiments, a face in an image can be detected by application of a Viola-Jones algorithm and an ASM algorithm. In particular, a Viola-Jones algorithm is a fast and quite accurate method for detecting a face region on an image. An ASM algorithm is applied to the face region to locate reference feature points associated with the face. These feature reference points can include one or more facial landmarks such as ala, philtrum, vermilion zonem, vermilion border, nasolabial sulcus, labial commissures, lip tubercle, nasion, outer canthos of eye, inner canthos of eye, and tragus of ear. Moreover, the feature reference points can include one or more of the following facial points indicating: eyebrows' vertical position, eyes' vertical position, eyes' width, eyes' height, eye separation distance, nose's vertical position, nose's pointing up, mouth's vertical position, mouth's width, chin's width, upper lip raiser, jaw drop, lip stretcher, left brow lowerer, right brow lowerer, lip corner depressor, and outer brow raiser. FIG. 5 shows an example image of a face where some of reference feature points are illustrated.

Further, an ASM algorithm starts searching for feature reference points of a mean facial shape which is aligned to the position and size of the face presented in the input video image. An ASM algorithm then repeats the following two steps until convergence: (i) suggest a tentative shape by adjusting the locations of shape points by template matching of image texture around each point, and (ii) conform the tentative shape to a global shape model. The shape model pools the results of weak template matchers to form a stronger overall classifier. The entire search is repeated at each level in an image pyramid, from coarse to fine resolution. Thus, two sub-model types make up ASM: a profile model and a shape model.

The profile models (one for each landmark at each pyramid level) are used to locate an approximate position of each feature reference point by template matching. Any template matcher can be used, but the classical ASM forms a fixed-length normalized gradient vector (also known as a profile) by sampling the image along a line (also known as a whisker) orthogonal to the shape boundary at a landmark. While training on manually landmarked faces, at each landmark (feature reference point) the mean profile vector $\bar{g}$ and the profile covariance matrix $S_g$ are calculated. While searching, the landmark (feature reference point) along the whisker is displaced to the pixel whose profile g has lowest Mahalanobis distance from the mean profile $\bar{g}$, where $$\text{MahalanobisDistance} = (g-\bar{g})^T S_g^{-1} (g-\bar{g}). \quad (1)$$

Further, the shape model specifies allowable constellations of landmarks. A shape of individual can be given by its shape vector $x=(x_i^T)^T$, where $x_i$ is i-th facial landmark. The shape model generates the shape $\hat{x}$ with $$\hat{x} = \bar{x} + \Phi b \quad (2)$$

where $\bar{x}$ is the mean shape, b is a parameter vector, and $\Phi$ is a matrix of selected eigenvectors of profile covariance matrix $S_g$ of the points of the aligned training shapes. Using a standard principal components approach, the model has as many variations as is desired by ordering the eigenvalues $\lambda_i$ and keeping an appropriate number of corresponding eigenvectors in $\Phi$. In this process, a single shape model for the entire ASM is used but it may be scaled for each pyramid level.

Further, Equation 2 is used to generate various shapes by varying the vector parameter b. By keeping the elements of b within limits (determined during model building), it is possible to ensure that generated face shapes are lifelike.

Conversely, given a suggested shape x, the method can calculate the parameter b that allows Equation 2 to better approximate x with a model shape $\hat{x}$. The method can further use an iterative algorithm to minimize $$\text{distance}(x, T(\bar{x}+\Phi b)) \quad (3)$$

where T is a similarity transform that maps the model space into the image space.

In one or more embodiments, CANDIDE-3 shape and initial state can be estimated based on a mapping of CAN- DIDE-3 vertices to weighted combinations of reference feature points located by ASM. CANDIDE-3 is a parameterized three-dimensional face mesh specifically developed for model-based coding of human faces. It includes a small number of polygons (approximately 100) and allows fast reconstruction. CANDIDE-3 is controlled by SUs, AUs, and a position vector. The SUs control mesh shape so that different face shapes can be obtained. The AUs control facial mimics so that different expressions can be obtained. The position vector corresponds to rotations around three (orthogonal) axes and translations along the axes.

Assuming that the observed face is frontal viewed in the image, only yaw estimation is needed among the three rotation parameters. It can be found as an angle from the positive direction of the x-axis to a vector joining the right eye center feature point with the left one. The following equation system can be created, assuming that the observed face is neutral and frontal viewed in the image, and the mesh points are projected on the image plane by scaled orthographic projection:

$$R\left\{\binom{x_i}{y_i} + \binom{\sum_{j=1}^{m} X_{ij}*b_j}{\sum_{j=1}^{m} Y_{ij}*b_j}\right\} + \binom{x}{y} = z\binom{\hat{x}_i}{\hat{y}_i} \quad (4)$$

where $$R = \begin{pmatrix} \cos\theta & -\sin\theta \\ \sin\theta & \cos\theta \end{pmatrix}$$

is a rotation matrix, corresponding to the found yaw $\theta$, $b_j$ is j-th SU intensity; x, y, z are mesh translational coordinates; $x_i$ and $y_i$ are i-th mesh vertex model coordinates; $\hat{x}_i$ and $\hat{y}_i$ are i-th mesh vertex image coordinates obtained as weighted combinations of reference feature points; and $X_{ij}$, $Y_{ij}$ are coefficients, which denote how the i-th mesh vertex model are changed by j-th SU. Based on the foregoing, the following minimization can be made:

$$\left(x_i\cos\theta - y_i\sin\theta + \sum_{j=1}^{m}(x_{ij}\cos\theta - Y_{ij}\sin\theta)*b_j + x - z\hat{x}_i\right)^2 + \quad (5)$$

$$\left(x_i\sin\theta + y_i\cos\theta + \sum_{j=1}^{m}(X_{ij}\sin\theta + Y_{ij}\cos\theta)*b_j + y - z\hat{y}_i\right)^2 \to \min_{b_j,x,y,z}.$$

The solution of this linear equation system is $$b = (X^T X)^{-1} X^T x \quad (6)$$

where $X = (((X_{ij} \cos\theta - Y_{ij} \sin\theta), 1, 0, -\hat{x}_i)^T, ((X_{ij} \sin\theta + Y_{ij} \cos\theta), 0, 1, -\hat{y}_i)^T)^T,$ $x = -((x_i \cos\theta - y_i \sin\theta)^T, (x_i \sin\theta + y_i \cos\theta)^T)^T,$ $b = ((b_j)^T, x, y, z)^T. \quad (7)$ In some embodiments, a Viola-Jones algorithm and ASM algorithm can be used to improve tracking quality. Face tracking processes can lose face position under some circumstances, such as fast movements and/or illumination variations. In order to re-initialize the tracking algorithm, a Viola-Jones algorithm and ASM algorithm are applied in such cases.

5. FACE TRACKING

This section focuses on example processes for face tracking that can be used in the present technology. Face tracking is needed not only to detect facial expressions, but also for monitoring a disposition of a face within a field of view of a camera. Because individuals can move in each video image (frame), make gestures, and rotate or move their heads, face tracking is required to accurately determine facial expressions.

Figure 6:
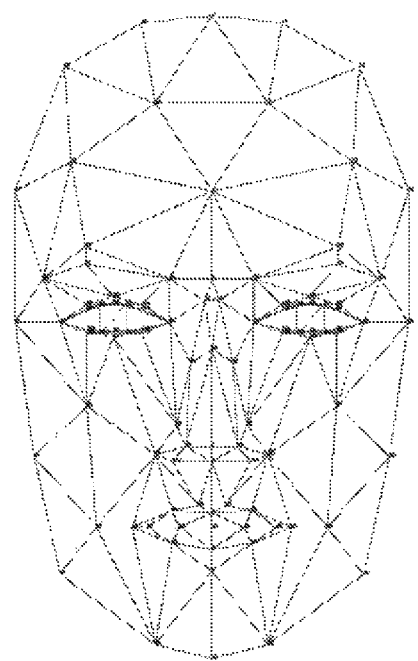
FIG. 6 shows an example mesh corresponding to a CANDIDE-3 model.

CANDIDE-3 model can be used for face tracking. See Jörgen Ahlberg, Candide-3—an updated parameterized face, Technical report, Linköping University, Sweden (2001). FIG. 6 shows an exemplary mesh corresponding to CANDIDE-3 model aligned to the face shown in FIG. 5.

In one or more embodiments, a state of CANDIDE-3 model can be described by an intensity vector of SUs, intensity vector of AUs and a position vector. SUs refer to various parameters of head and face. For example, the following SUs can be used: vertical position of eyebrows, vertical position of eyes, eyes' width, eyes' height, eye separation distance, nose vertical position, nose pointing up, mouth vertical position, mouth width, and chin width. AUs refer to face parameters that correspond to various face mimics. For example, the following AUs can be used: upper lip raiser, jaw drop, lip stretcher, left brow lowerer, right brow lowerer, lip corner depressor, and outer brow raiser.

Figure 7A:
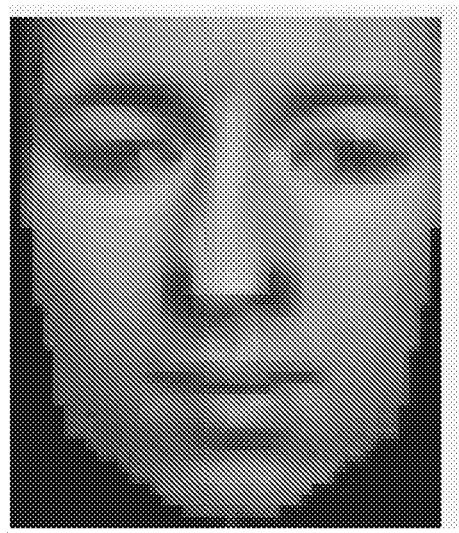
FIG. 7A shows an example mean face.
Figure 7B:
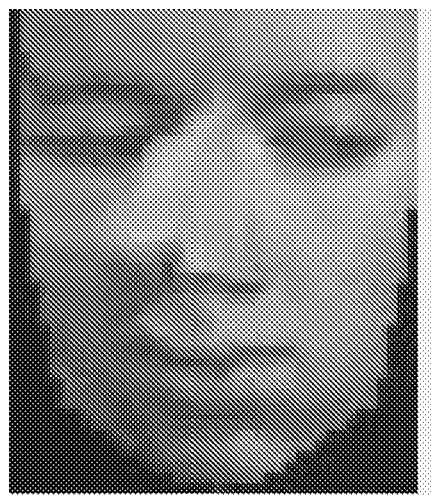
FIG. 7B shows an example observation under a current state of a mesh illustrated in FIG. 8.
Figure 8:
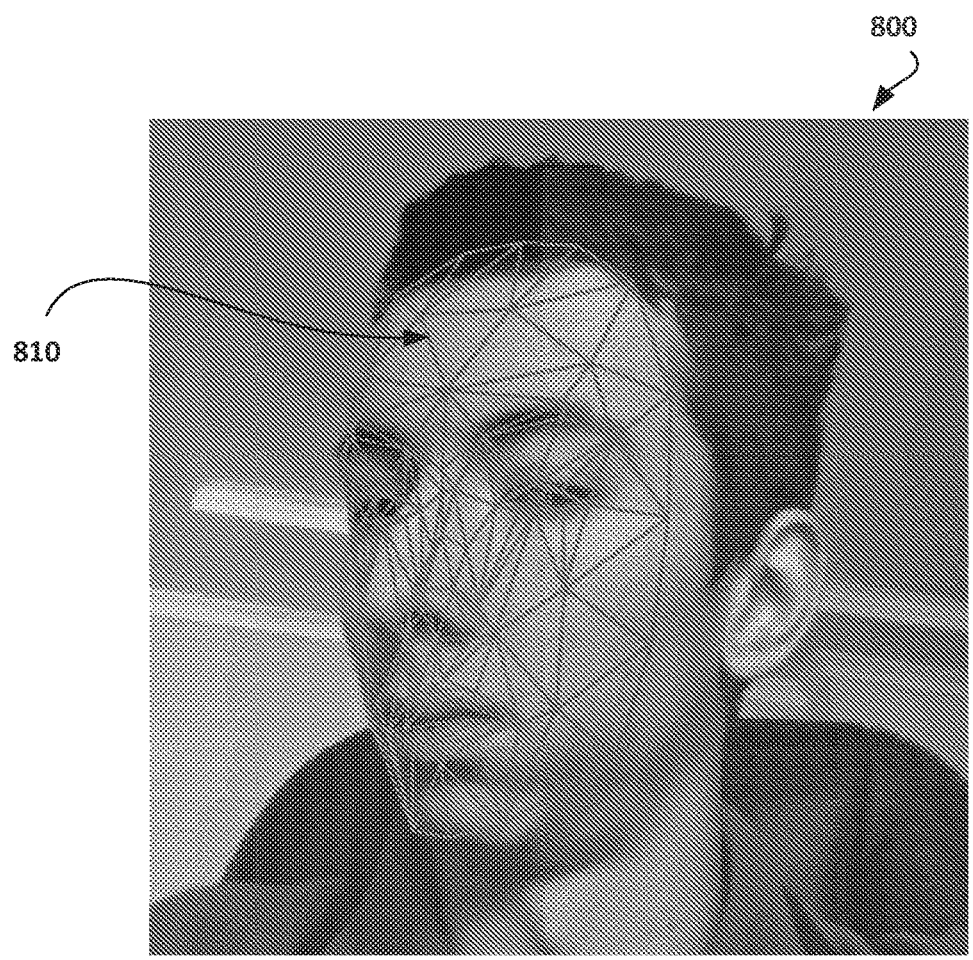
FIG. 8 shows an exemplary image having a face and a mesh aligned to the face.

The position of mesh, such as one shown in FIG. 6, can be described using six coordinates: yaw, pitch, roll, x, y, and z (scale). Following the Dornaika et al. approach, a mesh state can be determined by observing the region most likely to be a face. See Dornaika F. & Davoine F., *On appearance based face and facial action tracking*. IEEE Trans. Circuits Syst. Video Technol. 16(9):1107-1124 (2006). For each mesh state, observation errors can be calculated. Observation errors refer to a value indicating the difference between an image under a current mesh state and a mean face. FIG. 7A shows an example mean face. FIG. 7B shows an example warped towards initial CANDIDE-3 state observation under a current state of the mesh illustrated in FIG. 8. More specifically, FIG. 8 shows an exemplary image 800 having a face and a mesh 810 aligned to the face.

In one or more embodiments, a face modelled as a picture with a fixed size (e.g., width=40px, height=46px) is referred to as a mean face. In one or more embodiments, the observation process can be implemented as a warping process from the current CANDID-3 state towards its initial state, and denoted by $$x(b) = W(y,b), \quad (8)$$

where x denotes the observed image with the same size as of mean face, y denotes the input image, and b denotes the CANDIDE-3 AUs' intensities and position parameters. Gaussian distribution proposed in original algorithms has shown worse results compared to a static image. Thus, the difference between the current observation and mean face can be calculated as follows:

$$e(b) = \Sigma(\log(1+I_m) - \log(1+I_i))^2 \quad (9)$$

where $I_m$ denotes pixels of the mean face image and $I_i$ denotes observation pixels.

Logarithm function can make the tracking more stable and reliable. In one or more embodiments, a Taylor series can be used to minimize error. The gradient matrix is given by $$G = \frac{\partial W(y, b)}{\partial b} = \frac{\partial x}{\partial b} \quad (10)$$

Derivatives can be calculated as follows:

$$g_{ij} = \frac{W(y, b+\delta_j q_j)_i - W(y, b-\delta_j q_j)_i}{2\delta_j} \quad (11)$$

where $q_j$ is a vector with all elements zero except the j-th element that equals one.

Here, $g_{ij}$ is an element of matrix G. This matrix has size m*n, where m is larger than n (e.g., m is about 1600 and n is about 14). In case of straight-forward calculating, n*m operations of division have to be completed. To reduce the number of divisions, this matrix can be rewritten as a product of two matrices: G=A*B. Here, matrix A has the same size as G. Each element of matrix A can be represented as:

$$a_{ij} = W(y, b+\delta_j q_j)_i - W(y, b-\delta_j q_j)_i \quad (12)$$

Matrix B is a diagonal matrix with sizes n*n, and its elements can be represented as follows:

$$b_{ii} = (2\delta_i)^{-1}.$$

Matrix $G^+$ can be calculated as follows, which ultimately reduces a number of divisions:

$$G^+ = (G^T G)^{-1} G^T = (B^T A^T A B)^{-1} B^T A^T = B^{-1}(A^T A)^{-1} B^{-T} B^T A^T = B^{-1}(A^T A)^{-1} A^T \quad (13)$$

This transformation allows making $n^3$ divisions instead of $m*n+n^3$.

Yet another optimization can be used in this method. If matrix $G^+$ is created and then multiplied by $\Delta b$, it leads to $n^2 m$ operations, but if the first $A^T$ and $\Delta b$ are multiplied and then multiplied by $B^{-1}(A^T A)^{-1}$, there will be only $m*n+n^3$ operations, which is much better because n<<m.

Thus, face tracking in the video comprises CANDIDE-3 shape and initial state estimating that is based on located reference feature points associated with a particular face and aligning the mesh to the face in each video image. Notably, this process can be applied not only to a face, but also to other individual parts. In other words, this process of localization and tracking of a video conferencing participant may include localization and tracking of one or more of the participant's face, and his body, limbs, and/or other parts. In some embodiments, gesture detection and tracking processes can be also applied. In that case, the method may create a virtual skeleton and a mesh aligned to these body parts.

It should be also noted that ARM advanced SIMD (Single Instruction Multiple Data) extensions (also known as "NEON" provided by ARM Limited) can be used for multiplication of matrices in order to increase tracking performance. Also, a GPU (Graphics Processing Unit) can be used in addition to or instead of CPU (Central Processing Unit), whenever possible. Operations can be arranged in a particular way to get high performance of GPU.

According to some embodiments of the disclosure, the face tracking process can include the following features. First, a logarithm can be applied to grayscale the value of each pixel to track it. This transformation has a great impact to tracking performance. Second, in the procedure of gradient matrix creation, the step of each parameter can be based on the mesh scale.

In order to automatically re-initialize the tracking algorithm in failure cases, the following failure criterion can be used:

$$\|W(y_t, b_t) - W(y_{t-1}, b_{t-1})\|_2 > M \quad (14)$$

where $\|\cdot\|_2$ is Euclidean norm, $y_t$, $b_t$ are indexed by an image number t.

6. EMOTION RECOGNITION IN VIDEOCONFERENCING

As outlined above, when faces or other parts of video conference participants are detected, the present technology determines an emotional status of video conference participants. This may include identification of facial expressions or changes in facial expressions over time. The emotional status can be also partly based on speech recognition or voice analysis. If it is determined that the emotional status is negative, an alert communication can be generated and transmitted to one of a video conference participant or a third party. These and other embodiments for emotion recognition in video conferencing are described below with reference to exemplary flow charts.

Figure 9:
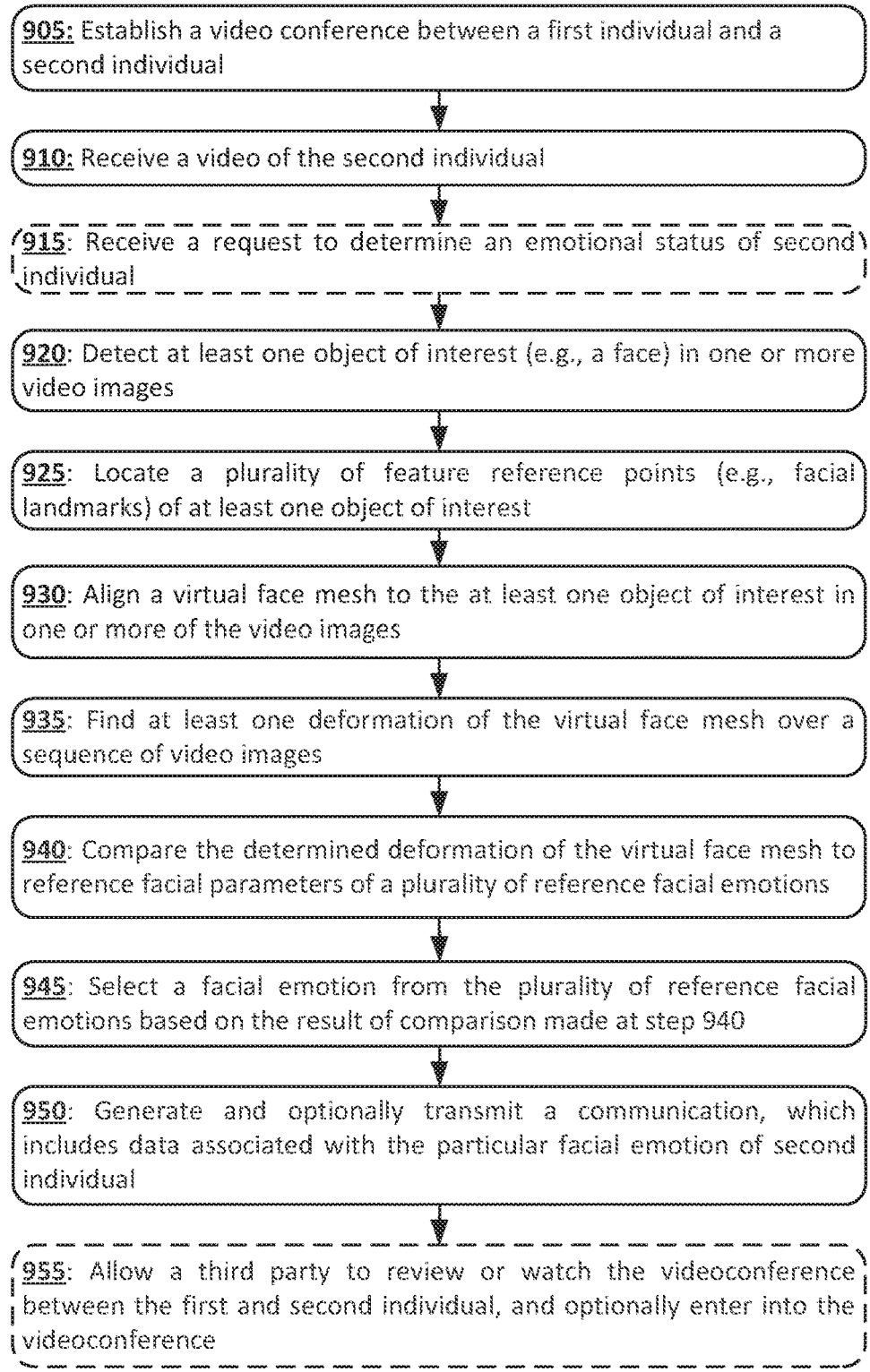
FIG. 9 is a process flow diagram showing an example method for video conferencing that involves emotion recognition.

FIG. 9 is a process flow diagram showing an example method 900 for video conferencing which involves emotion recognition. The method may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of system 400. Note that below recited steps of method 900 may be implemented in an order different than described and shown in FIG. 9. Moreover, method 900 may have additional steps not shown herein, but which can be evident for those skilled in the art from the present disclosure. Method 900 may also have fewer steps than outlined below and shown in FIG. 9.

Method 900 for video conferencing commences at step 905 with establishing a video conference between a first individual, such as a customer service representative or service provider, and a second individual, such as a customer. For these ends, in one embodiment, video chat applications 120 can be used on each side. The establishment of a video conference means that video and audio streams are captured on each side and transmitted to another side, and vice versa.

Accordingly, at step 910, a computing device receives a video of the second individual. As a general matter, the video includes a sequence of video images (also known as video frames) and the video can be received as a video stream meaning it can be continually supplied to the computing device (e.g., as progressive downloading) or it can be stored in a memory of the computing device. The video can be captured for video conferencing purposes, but not necessarily.

At optional step 915, the computing device receives a request to determine an emotional status (e.g., a facial emotion) of at least one video conference participant (e.g., second individual). In one example, the request can be generated manually by a first individual such as customer service representative or service provider. The request may optionally include metadata associated with the video conference participant of interest. For example, metadata may include a portion of the video where this individual appears.

At step 920, the computing device detects (localizes) at least one object of interest in one or more video images. As discussed above, the object of interest may refer to a human face or other parts of the body, including limbs, neck, arms, chest, and so forth, all related to a second individual (i.e., customer). The detection can be based on a Viola-Jones algorithm, although other algorithms can be also used. In some other embodiments, the detection of the at least one object of interest in one or more of the video images can be based on a user input. For example, the user input can include data associated with an image area related to the at least one object of interest.

At step 925, the computing device locates a plurality of feature reference points of at least one object of interest (e.g., a face). The feature reference points can include one or more facial landmarks such as ala, philtrum, vermilion zonem vermilion border, nasolabial sulcus, labial commissures, lip tubercle, nasion, outer canthos of eye, inner canthos of eye, and tragus of ear. Moreover, the feature reference points can include one or more of the following facial points indicating: eyebrows' vertical position, eyes' vertical position, eyes' width, eyes' height, eye separation distance, nose vertical position, nose pointing up, mouth vertical position, mouth width, chin width, upper lip raiser, jaw drop, lip stretcher, left brow lowerer, right brow lowerer, lip corner depressor, and outer brow raiser. The feature reference points can be located using ASM or extended ASM algorithms as explained above. However, other procedures of facial landmark localization can be also used including, but not limited to, exemplar-based graph matching (EGM) algorithm, consensus-of-exemplars algorithm, and so forth.

At step 930, the computing device aligns a virtual face mesh to the at least one object of interest (e.g., aligns the mesh to an image of the customer face) based at least in part on the reference feature points. This procedure can be performed with respect to just some of the video images or all video images. As discussed above, a parameterized face mesh such as CANDIDE-3 model can be aligned to the object of interest. CANDIDE-3 is a parameterized three-dimensional face mesh that can be aligned to an individual face shape based on calculation of intensities of AUs. In some embodiments, the aligning of the virtual face mesh can be further based on estimating intensities of SUs associated with the face shape, intensities of AUs, and rotations of the virtual face mesh around three orthogonal axes and its translations along the axes.

At step 935, the computing device finds over a sequence of video images at least one deformation of the mesh that is associated and reflects at least one face mimic. Mesh deformation can include relative disposition of one or more mesh vertices because of a change in emotional expression by the second individual. For example, the computing device can find modification of the mesh that replicate moving the labial commissure landmarks as well as the movement of eyebrows. In another example, the computing device can find modification of the mesh that replicate moving the outer and inner canthus of the eyes, as well as moving mouth landmarks. It should be appreciated that mesh can be deformed in a variety of different ways. In any case, the computing device can track changes in position of each mesh point, as well as a distance between each of the mesh points to determine changes in facial emotions.

At step 940, the computing device compares the determined deformation of the mesh to reference facial parameters of a plurality of reference facial emotions. The reference facial parameters and the reference facial emotions can be stored in one or more databases located, for example, in a memory of computing device. The reference facial emotions may include, for example, neutral facial emotions, positive facial emotions, and negative facial emotions. In certain embodiments, the negative facial emotions may include anger, indignation, dissatisfaction, vexation, frustration, embarrassment, irritation, stress, and annoyance.

The step 940 of comparing may include applying at least one machine-learning algorithm such as a convolution neural network (CNN) and/or a state vector machine (SVM). Generally, CNN is a type of feed-forward artificial neural network where the individual neurons are tiled in such a way that they respond to overlapping regions in the visual field. CNNs consist of multiple layers of small neuron collections, which look at small portions of the input image, called receptive fields. The results of these collections are then tiled so that they overlap to obtain a better representation of the original image; this is repeated for every such layer. Convolutional networks may include local or global pooling layers, which combine the outputs of neuron clusters. They also consist of various combinations of convolutional layers and fully connected layers, with pointwise nonlinearity applied at the end of or after each layer. To avoid the situation that there exist billions of parameters if all layers are fully connected, the idea of using a convolution operation on small regions, has been introduced. One major advantage of convolutional networks is the use of shared weight in convolutional layers, which means that the same filter (weights bank) is used for each pixel in the layer; this both reduces required memory size and improves performance.

SVMs are supervised learning models with associated learning algorithms that are configured to recognize patterns. Given a set of training examples, with each marked as belonging to one of two categories, an SVM training algorithm builds a model that assigns new examples into one category or the other, making it a non-probabilistic binary linear classifier. An SVM model is a representation of the examples as points in space, mapped so that the examples of the separate categories are divided by a clear gap that is as wide as possible. New examples are then mapped into that same space and predicted to belong to a category based on which side of the gap they fall on.

Figure 10A:
FIG. 10A shows an example positive facial emotion with a mesh aligned to a face area.
Figure 10B:
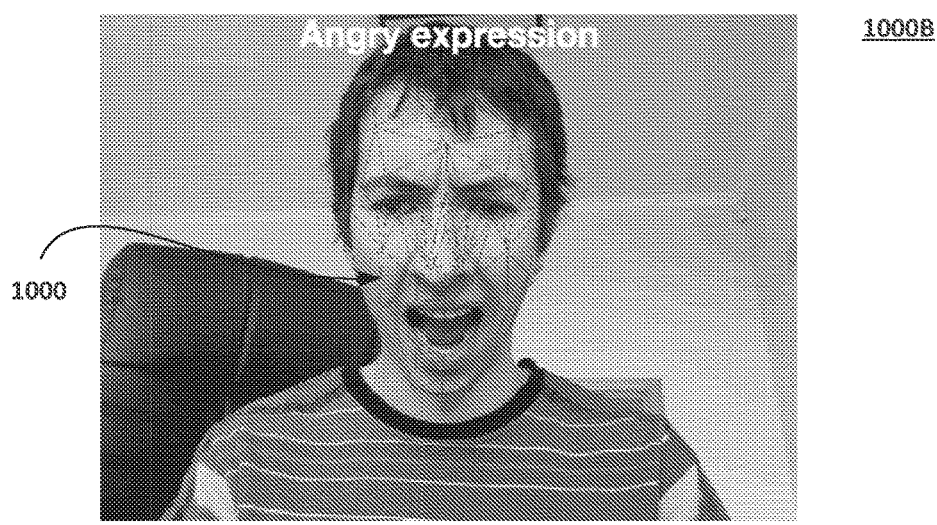
FIG. 10B shows an example negative facial emotion with a mesh aligned to a face area.

At step 945, based on the result of comparison made at step 940, the computing device selects a facial emotion from the plurality of reference facial emotions. In other words, at the steps 940 and 945, the computing device determines that the at least one deformation of the mesh refers to a particular facial emotion. FIGS. 10A and 10B show two video images 1000A and 1000B, respectively, which illustrate example facial emotions that can be identified by this method 900. In particular, FIG. 10A shows an example positive facial emotion with a mesh 1000 aligned to a face area, while FIG. 10B shows an example negative facial emotion (e.g. anger) with the mesh 1000 aligned to a corresponding face area.

At step 950, the computing device generates a communication, which includes data associated with the particular facial emotion. In certain embodiments, the communication is generated only if the particular facial emotion determined refers to a negative emotion such as anger, stress, annoyance, irritation, and the like. The communication can be also referred to as a notification, alert, indication, or message. Accordingly, the communication can be presented to the first individual (customer service representative or service provider) as a displayable message or audio message.

At the same step 950, the computing device can optionally transmit the communication containing data related to the facial emotion over a communications network to a third party such as a supervisor, manager, administrator, or moderator.

At optional step 955, the computing device may allow the third party to review or watch the videoconference between the first individual (customer service representative or service provider) and second individual (customer), and/or enter into the videoconference between the first individual and second individual. In this case, the third party may handle a difficult situation and attempt to resolve those angry customer issues that could not be resolved by the first individual. Entering into the videoconference between the first individual and second individual may optionally mean that the first individual is suspended from continuing the videoconferencing.

In some embodiments, the computing device may determine an emotional status of the second individual (customer) by combining data related to the determined facial emotion with other data. In one example, the emotional status can be determined based on facial emotions and gestures of the customer. For these ends, the computing device may track individual motions on the video, identify one or more gestures, and determine that at least one of the gestures relates to a predetermined emotion, such as a negative emotion. Further, the computing device may combine data associated with the determined facial emotion and data associated with the identified gesture, and generate an emotional status of second individual. Similar to above, the emotional status can be transmitted and presented to the first individual and/or third party.

Figure 11:
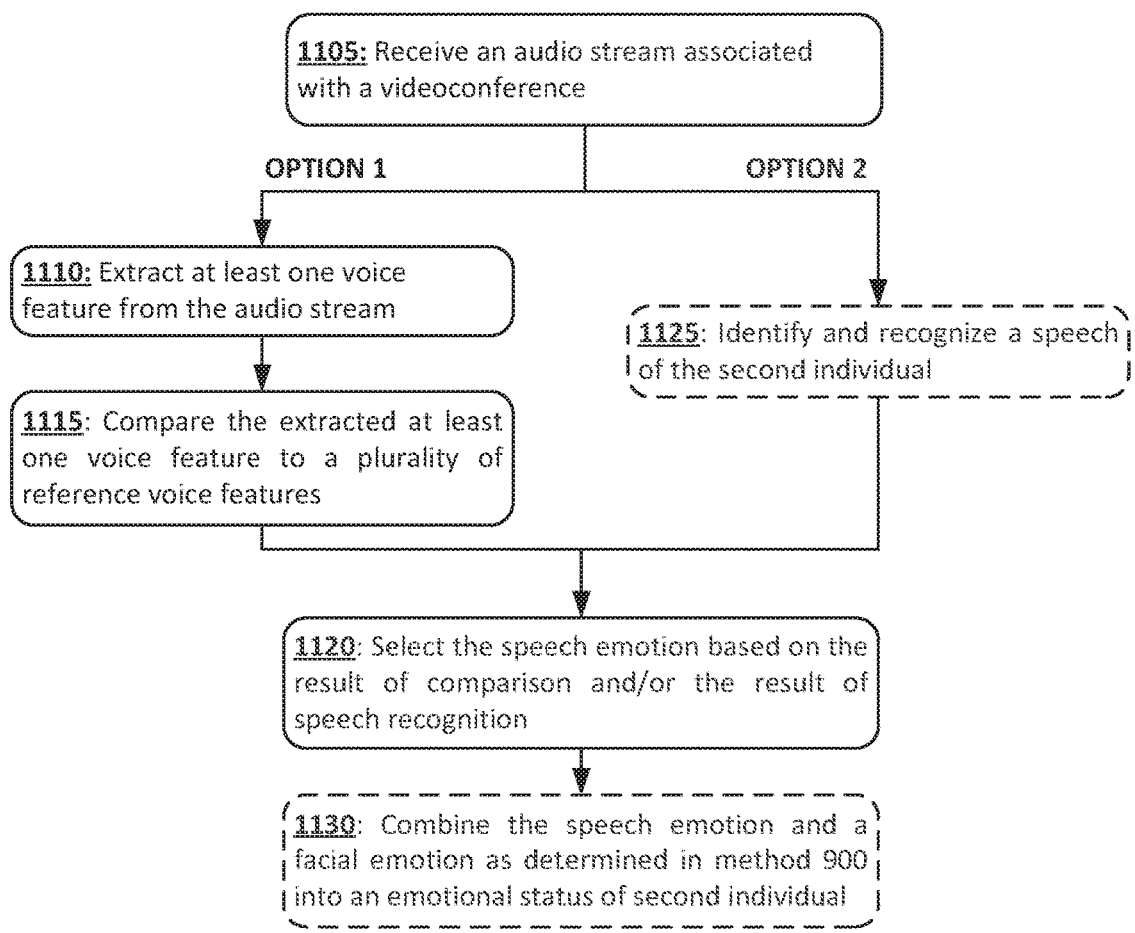
FIG. 11 is a process flow diagram showing an example process for audio emotion recognition that can be used in the method of FIG. 9.

FIG. 11 is a process flow diagram showing an example process 1100 for audio emotion recognition which can be used in method 900 for videoconferencing shown in FIG. 9. Process 1100 may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of system 400. Note that below recited steps of process 1100 may be implemented in an order different than described and shown in FIG. 11. Moreover, process 1100 may have additional steps not shown herein, but which can be evident for those skilled in the art from the present disclosure. Process 1100 may also have fewer steps than outlined below and shown in FIG. 11.

At step 1105, a computing device receives an audio stream associated with the video received at step 910. In other words, at step 1105, the computing device receives the audio stream of a videoconferencing session between a first individual, such as a customer service representative or service provider, and a second individual, such as a customer.

At step 1110, the computing device extracts at least one voice feature from the audio stream. Among voice features, there can be one or more of the following: a maximum value of fundamental frequency, standard deviation of fundamental frequency, range of fundamental frequency, mean value of fundamental frequency, mean of bandwidth of first formant, mean of bandwidth of second formant, standard deviation of energy, speaking rate, slope of fundamental frequency, maximum value of first formant, maximum value of second formant, maximum value of energy, range of energy, range of second formant, and range of first formant.

At step 1115, the computing device compares the extracted at least one voice feature to a plurality of reference voice features. Similar to method 900, this step can be performed with the help of a machine-learning algorithm such as SVM, CNN, and a statistical or heuristic algorithm.

At step 1120, the computing device selects the speech emotion based on the comparison of the extracted at least one voice feature to the plurality of reference voice features.

In some embodiments, in addition to steps 1110 and 1115, or instead of steps 1110 and 1115, at optional step 1125, the computing device can identify and recognize a speech of the second individual (i.e., transform speech input into text input for further processing). For example, one or more natural language processing processes can be applied at step 1125 to detect speech and transform it into text.

Based on the analysis of recognized speech, at step 1120, the computing device may select or facilitate selection of a particular speech emotion as the result of the presence of certain keywords or phrases in the recognized speech. For example, when recognized speech includes vulgar, offensive, or vile slang words, a negative emotion can be selected and attributed to the audio stream.

At step 1130, the computing device optionally combines the speech emotion and facial emotion as determined in method 900 into a single emotional status of the second individual (customer). Further, the emotional status can be transmitted and presented to the first individual (service provider) and/or third party (supervisor) for further action as discussed above.

7. CONCLUSION

Thus, methods and systems for videoconferencing involving emotion recognition have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for video conferencing, the method comprising:
   receiving a video including a sequence of images and an audio stream;
   detecting at least one object of interest in one or more of the images;
   locating feature reference points of the at least one object of interest;
   aligning a virtual face mesh to the at least one object of interest in one or more of the images based at least in part on the feature reference points;
   finding over the sequence of images at least one deformation of the virtual face mesh, wherein the at least one deformation is associated with at least one face mimic;
   determining that the at least one deformation refers to a facial emotion selected from a plurality of reference facial emotions;
   recognizing a speech emotion in the audio stream of the at least one object of interest; and
   generating a communication bearing data associated with one or more of the facial emotion and the speech emotion.

2. The computer-implemented method of claim 1, wherein recognizing the speech emotion comprises:
- extracting at least one voice feature from the audio stream;
- comparing the extracted at least one voice feature to a plurality of reference voice features; and
- selecting the speech emotion based on the comparison of the extracted at least one voice feature to the plurality of reference voice features.

3. The computer-implemented method of claim 1, wherein the object of interest is a first user and the video stream comprises speech from the first user and a second user, and the method further comprises:
- recognizing a speech emotion of the second user; and
- recognizing the speech emotion of the first user based on the speech of the first user and the speech emotion of the second user.

4. The computer-implemented method of claim 1, wherein recognizing the speech emotion comprises recognizing a speech in the audio stream.

5. The computer-implemented method of claim 1, wherein the communication bearing data associated with the facial emotion further includes data associated with the speech emotion.

6. The computer-implemented method of claim 1 further comprising:
- combining the facial emotion and the speech emotion to generate an emotional status of an individual associated with the at least one object of interest.

7. The computer-implemented method of claim 1, wherein recognizing the speech emotion further comprises:
- identifying one or more keywords within the audio stream of the at least one object of interest;
- determining at least one keyword of the one or more keywords is associated with a negative emotion; and
- selecting a negative emotion as the speech emotion of the at least one object of interest.

8. A system, comprising:
- one or more processors; and
- a non-transitory processor-readable medium coupled to the one or more processors, the non-transitory processor-readable medium comprising processor-executable instructions that, when executed by one or more processors of a machine, cause the machine to perform operations comprising:
  - receiving a video including a sequence of images and an audio stream;
  - detecting at least one object of interest in one or more of the images;
  - locating feature reference points of the at least one object of interest;
  - aligning a virtual face mesh to the at least one object of interest in one or more of the images based at least in part on the feature reference points;
  - finding over the sequence of images at least one deformation of the virtual face mesh, wherein the at least one deformation is associated with at least one face mimic;
  - determining that the at least one deformation refers to a facial emotion selected from a plurality of reference facial emotions;
  - recognizing a speech emotion in the audio stream of the at least one object of interest; and
  - generating a communication bearing data associated with one or more of the facial emotion and the speech emotion.

9. The system of claim 8, wherein recognizing the speech emotion comprises:
- extracting at least one voice feature from the audio stream;
- comparing the extracted at least one voice feature to a plurality of reference voice features; and
- selecting the speech emotion based on the comparison of the extracted at least one voice feature to the plurality of reference voice features.

10. The system of claim 8, wherein the object of interest is a first user and the video stream comprises speech from the first user and a second user, and the operations further comprise:
- recognizing a speech emotion of the second user; and
- recognizing the speech emotion of the first user based on the speech of the first user and the speech emotion of the second user.

11. The system of claim 8, wherein recognizing the speech emotion comprises recognizing a speech in the audio stream.

12. The system of claim 8, wherein the communication bearing data associated with the facial emotion further includes data associated with the speech emotion.

13. The system of claim 8, wherein the operations further comprise:
- combining the facial emotion and the speech emotion to generate an emotional status of an individual associated with the at least one object of interest.

14. The system of claim 8, wherein recognizing the speech emotion further comprises:
- identifying one or more keywords within the audio stream of the at least one object of interest;
- determining at least one keyword of the one or more keywords is associated with a negative emotion; and
- selecting a negative emotion as the speech emotion of the at least one object of interest.

15. A non-transitory processor-readable medium comprising processor-executable instructions that, when executed by one or more processors of a machine, cause the machine to perform operations comprising:
- receiving a video including a sequence of images and an audio stream;
- detecting at least one object of interest in one or more of the images;
- locating feature reference points of the at least one object of interest;
- aligning a virtual face mesh to the at least one object of interest in one or more of the images based at least in part on the feature reference points;
- finding over the sequence of images at least one deformation of the virtual face mesh, wherein the at least one deformation is associated with at least one face mimic;
- determining that the at least one deformation refers to a facial emotion selected from a plurality of reference facial emotions;
- recognizing a speech emotion in the audio stream of the at least one object of interest; and
- generating a communication bearing data associated with one or more of the facial emotion and the speech emotion.

16. The non-transitory processor-readable medium of claim 15, wherein recognizing the speech emotion comprises:
- extracting at least one voice feature from the audio stream;
- comparing the extracted at least one voice feature to a plurality of reference voice features; and selecting the speech emotion based on the comparison of the extracted at least one voice feature to the plurality of reference voice features.

17. The non-transitory processor-readable medium of claim 15, wherein the object of interest is a first user and the video stream comprises speech from the first user and a second user, and the operations further comprise:
  recognizing a speech emotion of the second user; and
  recognizing the speech emotion of the first user based on the speech of the first user and the speech emotion of the second user.

18. The non-transitory processor-readable medium of claim 15, wherein recognizing the speech emotion comprises recognizing a speech in the audio stream.

19. The non-transitory processor-readable medium of claim 15, wherein the communication bearing data associated with the facial emotion further includes data associated with the speech emotion.

20. The non-transitory processor-readable medium of claim 15, wherein the operations further comprise:
  combining the facial emotion and the speech emotion to generate an emotional status of an individual associated with the at least one object of interest.

* * * * *